(12) United States Patent
Nollet

(10) Patent No.: US 7,667,434 B2
(45) Date of Patent: Feb. 23, 2010

(54) METHOD OF MANAGING THE SUPPLY OF ELECTRICAL POWER, AN ELECTRICAL POWER SUPPLY CIRCUIT, AND A METHOD OF POWERING AN APPLIANCE WHEN COLD

(75) Inventor: Michel Nollet, Noisy le Roi (FR)

(73) Assignee: Sagem Defense Securite, Paris (FR)

( * ) Notice: Subject to any disclaimer, the term of this patent is extended or adjusted under 35 U.S.C. 154(b) by 181 days.

(21) Appl. No.: 11/642,618

(22) Filed: Dec. 21, 2006

(65) Prior Publication Data
US 2007/0152634 A1 Jul. 5, 2007

(30) Foreign Application Priority Data
Dec. 22, 2005 (FR) ................... 05 13199

(51) Int. Cl.
*H01M 10/44* (2006.01)
*H01M 10/46* (2006.01)
(52) U.S. Cl. ..................................... 320/116
(58) Field of Classification Search ................ 320/103, 320/110, 112, 116, 117, 128
See application file for complete search history.

(56) References Cited

U.S. PATENT DOCUMENTS

| 6,262,562 | B1 | 7/2001 | Cummings et al. | |
| 6,268,711 | B1 | 7/2001 | Bearfield | |
| 6,452,361 | B2 * | 9/2002 | Dougherty et al. | 320/104 |
| 2002/0076071 | A1 * | 6/2002 | Single | 381/312 |

FOREIGN PATENT DOCUMENTS

| EP | 0665627 A2 | 8/1995 |
| EP | 1137150 A2 | 9/2001 |

* cited by examiner

Primary Examiner—Edward Tso
(74) Attorney, Agent, or Firm—Muncy, Geissler, Olds & Lowe, PLLC

(57) ABSTRACT

The present invention relates to a method of managing a supply of electrical power to an appliance that is delivered by means of at least a first battery and a second battery, said method comprising the following steps: powering the appliance by means of the first battery so long as said first battery has a level of charge sufficient for powering the appliance; when the battery has a level of charge that is insufficient, powering the appliance by means of the second battery; and powering the appliance with both of the batteries in parallel when the levels of charge of both batteries are substantially equal and insufficient for it to be possible to power the appliance using a single one of the batteries. The invention also relates to an electrical power supply circuit for implementing said method, and to a method of powering an appliance when cold.

10 Claims, 1 Drawing Sheet

METHOD OF MANAGING THE SUPPLY OF ELECTRICAL POWER, AN ELECTRICAL POWER SUPPLY CIRCUIT, AND A METHOD OF POWERING AN APPLIANCE WHEN COLD

The present invention relates to a method of managing the supply of electrical power, and to an electrical power supply circuit for powering an appliance. The invention also relates to a method of powering an appliance when cold.

BACKGROUND OF THE INVENTION

Equipment exists that is designed to be carried by people and that comprises an electrical appliance equipped with a battery. Unfortunately, in order to have a sufficient reserve of energy, the battery is relatively heavy and voluminous, making the equipment uncomfortable and tiring to carry, in particular when the user has to carry it for a long time or has to make efforts while carrying it.

In order to obviate that drawback, it has been imagined to power the electrical appliance by means of a separate power supply circuit having two batteries. The use of two batteries that are separate from the appliance is advantageous because the batteries and the appliance can be disposed at different places on the body of the user. The weight of the equipment is then distributed over the user, making it more comfortable and less tiring to carry the equipment.

Such a power supply circuit includes a first battery and a second battery that are connected to a connection member that is external to the circuit via a switch device that is suitable for being actuated to go into a first connection state and into a second connection state, in which states it connects respectively the first battery or the second battery to the external connection member. The circuit also includes a management member that is arranged to detect a level of charge in each of the batteries and that is connected to the switch device for causing the switch device to go over from the first connection state to the second connection state when the first battery has a level of charge that is less than a predetermined threshold. Thus, the battery that is discharged to the greatest extent is used so long as its level of charge is sufficient to power the equipment. A user of the appliance having access to a stock of recharged batteries need only change one battery if the switch has remained in its first connection state whereas if both of the two batteries were used without distinguishing between them, the user would have had to change both batteries in order to have a maximum reserve of energy. That simplifies managing the stock of recharged batteries, and makes it possible to reduce the size of said stock compared with the stock that would be necessary if the user always changed both batteries.

Nevertheless, the length of operating time procured by the batteries before they need to be recharged remains insufficient for using the equipment for long periods, in particular in cold weather when the batteries have high internal resistance that reduces their performance.

OBJECT OF THE INVENTION

An object of the invention is to propose means making it possible to increase the length of time for which a power supply circuit can operate without recharging being necessary, said circuit having a plurality of batteries offering the above-mentioned advantages.

SUMMARY OF THE INVENTION

To this end, the invention provides a method of managing a supply of electrical power to an appliance that is delivered by means of at least a first battery and a second battery, said method comprising the following steps:

powering the appliance by means of the first battery so long as said first battery has a level of charge sufficient for powering the appliance;

when the battery has a level of charge that is insufficient, powering the appliance by means of the second battery; and powering the appliance with both of the batteries in parallel when the levels of charge of both batteries are substantially equal and insufficient for it to be possible to power the appliance using a single one of the batteries.

The invention also provides an electrical power supply circuit having at least a first battery and a second battery that are connected to an external connection member that is external to the circuit via a switch device that is suitable for being actuated to go into a first connection state and into a second connection state, in which states it connects respectively the first battery or the second battery to the external connection member, the circuit also having a management member that is arranged to detect a level of charge in each of the batteries and that is connected to the switch device for causing the switch device to go over from the first connection state to the second connection state when the first battery has a level of charge that is less than a predetermined threshold, wherein the switch device also has a third connection state in which it connects both of the batteries simultaneously and in parallel to the external connection member, and the management member is arranged to cause the switch device to go over from the second connection state to the third connection state when the batteries have levels of charge that are substantially identical.

Connecting the batteries in parallel makes it possible to form a set of batteries having overall internal resistance equal to one half of the internal resistance of one battery, so that the usable capacity of the resulting set of batteries is greater than the sum of the usable capacities remaining in each battery. The usable level of charge of the set of batteries is thus greater than the predetermined threshold and can be used for powering an electrical appliance.

The invention also provides a method of powering an appliance when cold, said appliance being connected at least to a first battery and to a second battery, said method comprising the following steps:

powering the appliance with the two batteries in parallel as soon as the appliance is switched on and so long as the levels of charge of both batteries are substantially equal and insufficient to enable the appliance to be powered by a single one of the batteries; then powering the appliance by means of the first battery so long as said first battery has a level of charge sufficient to power the appliance; and when the first battery has a level of charge that is insufficient, powering the appliance by means of the second battery.

Other characteristics and advantages of the invention will appear on reading the following description of a particular non-limiting implementation of the invention.

BRIEF DESCRIPTION OF THE DRAWING

Reference is made below to the accompanying sole FIGURE which diagrammatically shows equipment including a power supply circuit of the invention.

DETAILED DESCRIPTION OF THE INVENTION

Figure 1:
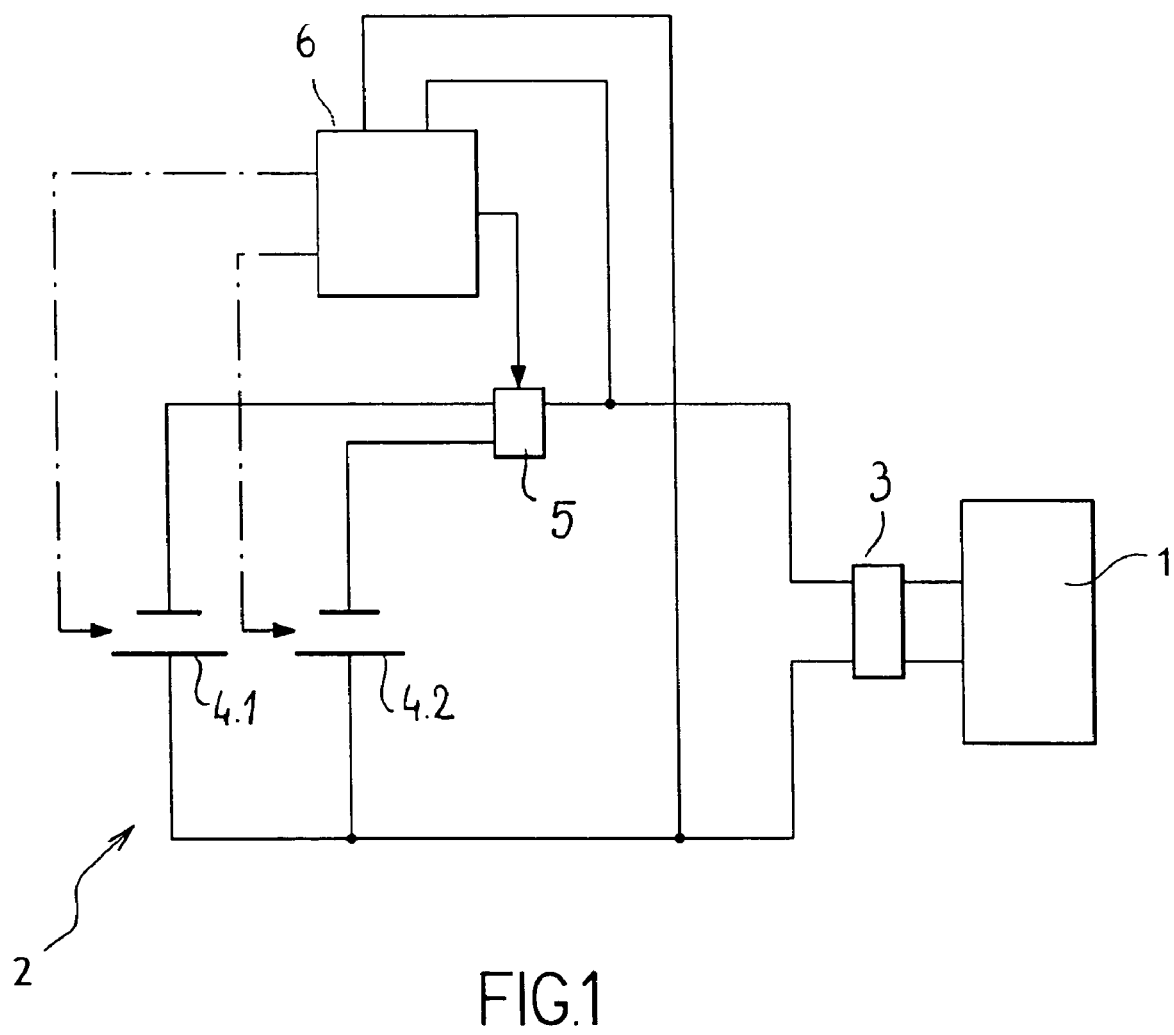

The equipment includes an electrical appliance 1 such as a communications terminal, a computer unit, an optoelectronic device, etc., and an electrical power supply circuit given overall reference 2. The electrical appliance 1 is connected to an external connection member 3 that is external to the power supply circuit 2. The external connection member 3, which is known per se, is, for example, a connector provided with pins.

The power supply circuit 2 includes a first battery 4.1 and a second battery 4.2 which are connected to the external connection member 3 via a switch device 5. It should be noted that, in this example, the batteries are connected together in parallel directly by the switch member.

In this example, the batteries 4.1, 4.2, which are known per se, are lithium-ion (Li-ion) batteries of the smart type, i.e. of the type complying with the specifications of the Smart Battery Systems (SBS) industrial standard, incorporating a processor that is suitable for delivering information relating to the level of charge of the battery.

The switch device 5 is suitable for being actuated to go selectively into a first connection state in which it connects the battery 4.1 to the external connection member 3, into a second connection state in which it connects the battery 4.2 to the external connection member 3, and into a third connection state in which it connects both batteries 4.1, 4.2 simultaneously and in parallel to the external connection member 3.

The power supply circuit 2 includes a management member 6 that is arranged to detect a level of charge in each of the batteries 4.1, 4.2 and that is connected to the switch device 5 so as to control said switch device. In this example, the management member 6 incorporates a processor that is suitable for executing a computer program and that is arranged to communicate with the processor of each battery 4.1, 4.2 and to collect the level of charge of each of the batteries 4.1, 4.2 from the corresponding processor.

A method of the invention for managing the supply of electrical power to the appliance is described below.

Said method starts with the step of powering the appliance 1 by means of the battery 4.1 while said battery has a level of charge that is sufficient to power the appliance 1. The management member 6 controls the switch member 5 so that it goes into its first connection state.

When the management member 6 detects that the battery 4.1 has a level of charge less than a predetermined threshold (i.e. a level of charge that is insufficient for powering the appliance 1 without running any risk of degrading the battery 4.1), the management member 6 actuates the switch member 5 to go into its second connection state so as to power the appliance 1 via the battery 4.2.

When the management member 6 detects that the battery 4.2 has a level of charge less than the predetermined threshold (the level of charge of the battery 4.2 is then substantially identical to the level of charge of the battery 4.1), the management member 6 actuates the switch member 5 to go into its third connection state so as to connect the batteries 4.1, 4.2 in parallel to the external connection member 3 and thus to the appliance 1.

It should be noted that the levels of charge of the batteries 4.1, 4.2 can be insufficient merely temporarily, e.g. when the temperature of the batteries is very low, and can become sufficient again when the temperature rises, and the management member 6 then causes the switch member 5 to return to its first connection state.

A method of powering the appliance when cold is described below.

The method of powering comprises the following steps:

powering the appliance with the two batteries in parallel as soon as the appliance is switched on and so long as the levels of charge of both batteries are substantially equal and insufficient to enable the appliance to be powered by a single one of the batteries 4.2; then powering the appliance by means of the first battery 4.1 so long as said first battery has a level of charge sufficient to power the appliance; and when the first battery 4.1 has a level of charge that is insufficient, powering the appliance by means of the second battery 4.2.

It is possible for the management member of the appliance to be powered by a single one of the batteries and for it to control the switch member 5 immediately so that it takes up a state for delivering the power to the appliance via both of the batteries in parallel, or for the management member 6 to be powered via both of the batteries in parallel (the switch member 5 returning automatically into its third connection state on switching the appliance on or on switching it off). Thereafter, as soon as the charge state of the battery 4.1 and/or of the battery 4.2 so permit, the management member 6 controls the switch member 5 so that the appliance is powered by a single battery.

Naturally, the invention is not limited to the implementation described, but rather it covers any variant lying within the ambit of the invention as defined by the claims.

In particular, the management member 6 can be associated with a coulomb meter or with a voltage detector for the purpose of detecting the levels of charge of the batteries, in particular when the batteries used are conventional batteries rather than batteries of the smart type. In which case, when the management member is associated with a voltage detector, the management member compares the detected voltage with a voltage threshold representative of the minimum level of charge required for powering the appliance.

It can also be imagined to cause the batteries to be put into parallel when the temperature is less than a predetermined threshold. Thus, if the temperature is less than the threshold, it is decided that the power is delivered directly to the appliance by both batteries in parallel. It is also possible, prior to powering with both batteries in parallel, to check the level of charge of each of the batteries.

The number of batteries can be greater than two, it then being possible for all of the batteries or only some of them to be simultaneously connected in parallel to the appliance to be powered. Whether there are two or more than two batteries, the management member can control the switch member so as to power the appliance via the battery that is discharged to the greatest extent so long as its level of charge is sufficient, and via both of the batteries in parallel (or at least two batteries or a higher number of batteries, if there are more than two batteries) when each of the batteries has a level of charge that is insufficient, on its own, for powering the appliance.

The function of management member can also be provided directly by the appliance and the power supply circuit can in general be incorporated into the appliance.

The power supply circuit can power one or more appliances.

What is claimed is:

1. A method of managing a supply of electrical power to an appliance that is delivered by means of at least a first battery and a second battery, said method comprising the following steps:

powering the appliance by means of the first battery so long as said first battery has a level of charge sufficient for powering the appliance;

when the first battery has a level of charge that is insufficient, powering the appliance by means of the second battery; and powering the appliance with both of the batteries in parallel when the levels of charge of both batteries are substantially equal and insufficient for it to be possible to power the appliance using a single one of the batteries.

2. A method of powering an appliance when cold, said appliance being connected at least to a first battery and to a second battery, said method comprising the following steps:

powering the appliance with the two batteries in parallel as soon as the appliance is switched on and so long as the levels of charge of both batteries are substantially equal and insufficient to enable the appliance to be powered by a single one of the batteries; then powering the appliance by means of the first battery so long as said first battery has a level of charge sufficient to power the appliance; and when the first battery has a level of charge that is insufficient, powering the appliance by means of the second battery.

3. An electrical power supply circuit for implementing the method of claim 1 or claim 2, the circuit having at least the first battery and the second battery that are connected to an external connection member that is external to the circuit via a switch device that is suitable for being actuated to go into a first connection state and into a second connection state, in which states it connects respectively the first battery or the second battery to the external connection member, the circuit also having a management member that is arranged to detect a level of charge in each of the batteries and that is connected to the switch device for causing the switch device to go over from the first connection state to the second connection state when the first battery has a level of charge that is less than a predetermined threshold, in which circuit the switch device also has a third connection state in which it connects both of the batteries simultaneously and in parallel to the external connection member, and the management member is arranged to cause the switch device to go over from the second connection state to the third connection state when the batteries have levels of charge that are substantially identical.

4. An electrical power supply circuit for implementing the method of claim 3, wherein the management member is powered by at least one of the batteries.

5. An electrical power supply circuit for implementing the method of claim 4, wherein the management member is connected with the batteries downstream relative to the switch device.

6. An electrical power supply circuit for implementing the method of claim 5, wherein the switch device returns automatically into the third connection state on switching the appliance on or on switching it off.

7. An electrical power supply circuit for implementing the method of claim 3, wherein when the management member detects that the first battery has a level of charge less than a predetermined threshold, which is a level of charge that is insufficient for powering the appliance without running any risk of degrading the battery, the management member actuates the switch member to go into its second connection state so as to power the appliance via the second battery.

8. An electrical power supply circuit for implementing the method of claim 7, wherein when the management member detects that the second battery has a level of charge less than the predetermined threshold, so that the level of charge of the first battery is then substantially identical to the level of charge of the second battery, the management member actuates the switch member to go into its third connection state so as to connect the batteries in parallel to the external connection member and thus to the appliance.

9. A method of powering an appliance, comprising the steps of:

providing at least two batteries for powering the appliance:

comparing the level of charge of each battery with a predetermined threshold corresponding to a level of charge that is insufficient for powering the appliance; and powering the appliance by the batteries based on the comparing step.

10. An electrical power supply circuit for implementing the method of claim 9, the circuit having at least a first battery and a second battery that are connected to an external connection member that is external to the circuit via a switch device that is suitable for being actuated to go into a first connection state and into a second connection state, in which states it connects respectively the first battery or the second battery to the external connection member, the circuit also having a management member that is arranged to detect a level of charge in each of the batteries and that is connected to the switch device for causing the switch device to go over from the first connection state to the second connection state when the first battery has a level of charge that is less than a predetermined threshold, in which circuit the switch device also has a third connection state in which it connects both of the batteries simultaneously and in parallel to the external connection member, and the management member is arranged to cause the switch device to go over from the second connection state to the third connection state when the batteries have levels of charge that are substantially identical.

* * * * *